Nov. 16, 1926.
A. VASZIN
1,606,854
WATER TOBOGGAN
Original Filed April 2, 1925   2 Sheets-Sheet 1
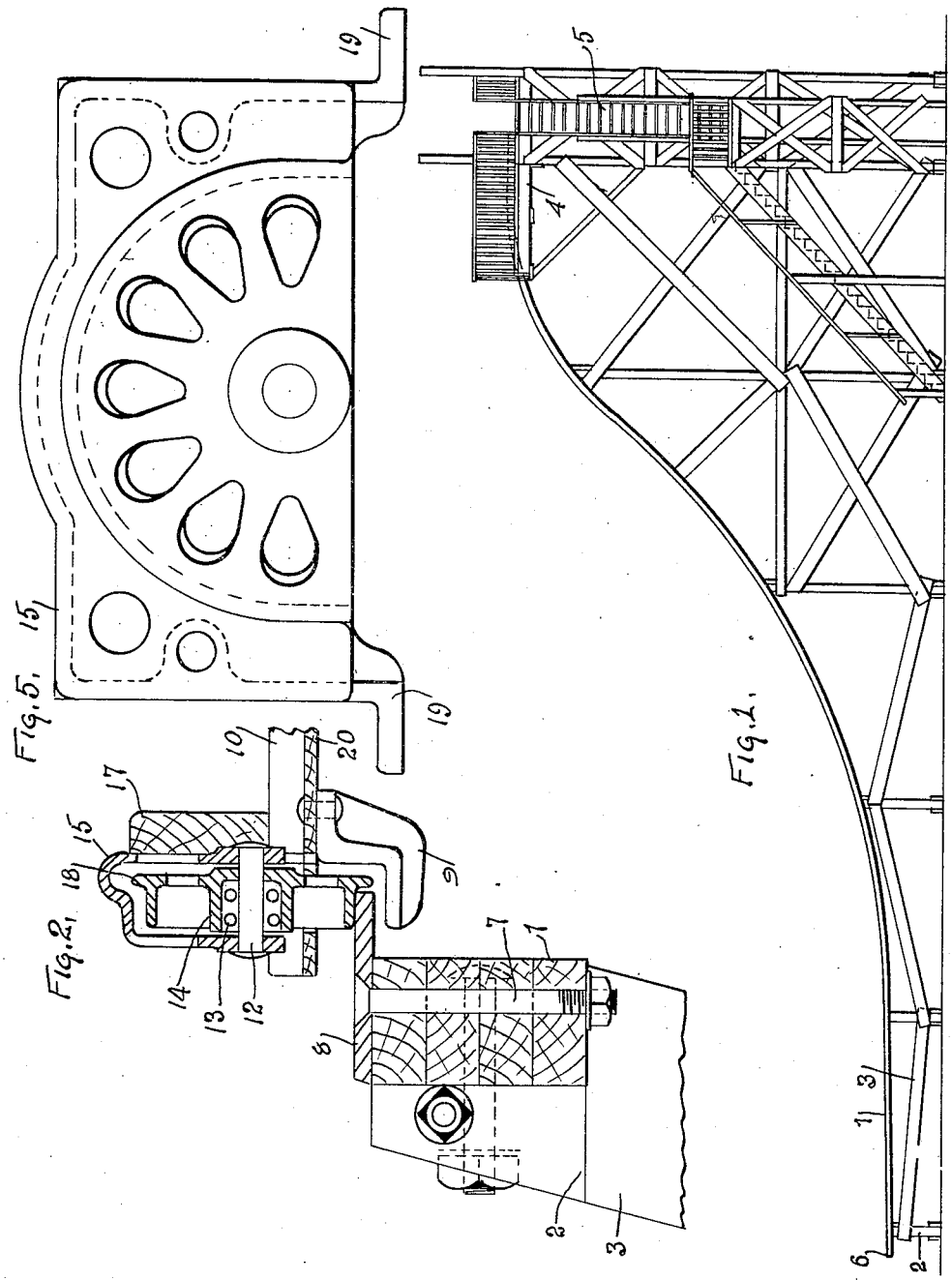
INVENTOR
AUREL VASZIN,
By Toulmin & Toulmin
ATTORNEYS

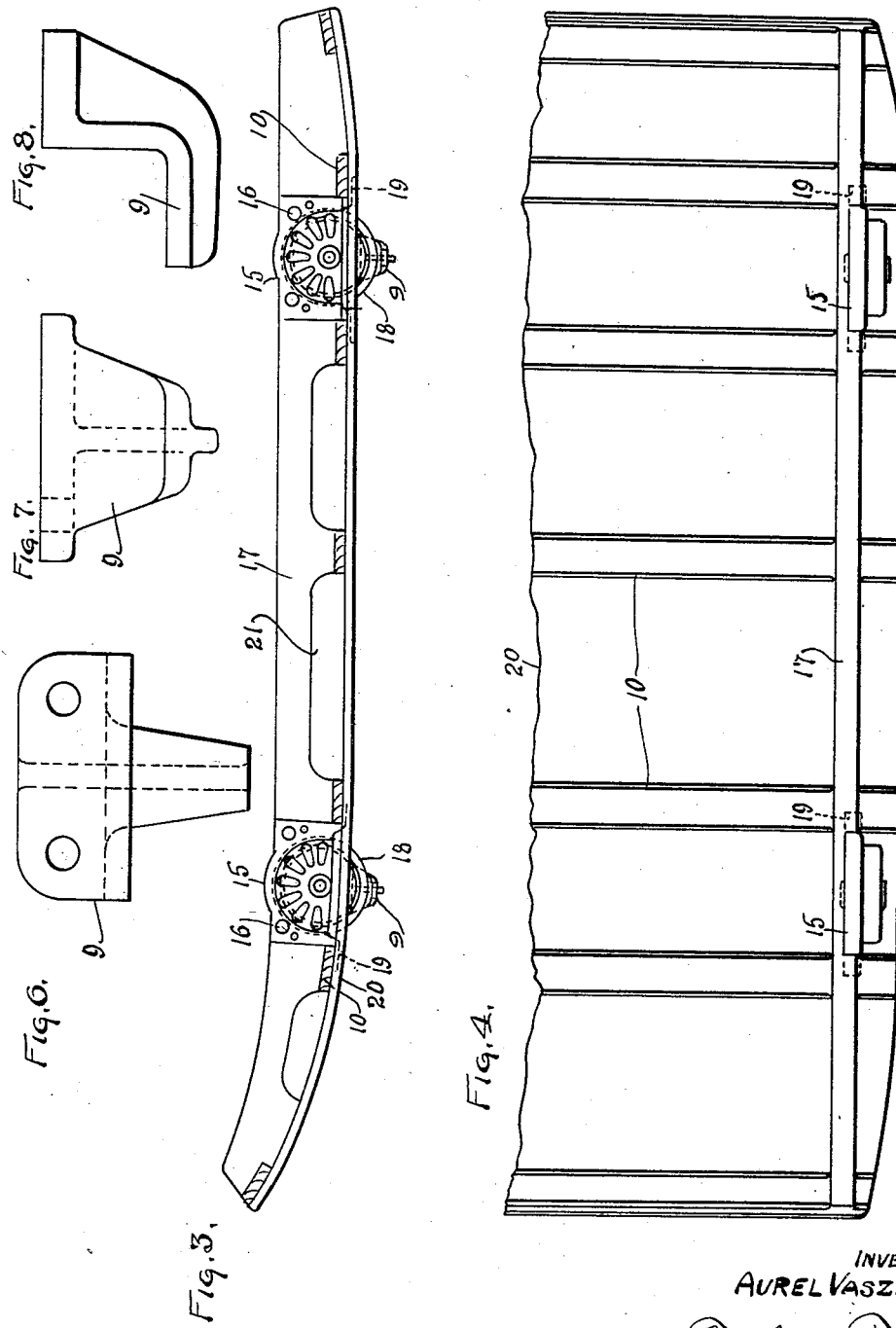

Patented Nov. 16, 1926.

1,606,854

UNITED STATES PATENT OFFICE.

AUREL VASZIN, OF DAYTON, OHIO.

WATER TOBOGGAN.

Application filed April 2, 1925. Serial No. 20,065. Renewed October 1, 1926.

My invention relates to a water toboggan and in particular to a safety means of preventing the toboggan car from leaving the track.

It is the object of my invention to provide a safety toboggan on which the car will be firmly held without interfering with its movement in tobogganing down the incline to the water. As these toboggans are arranged at substantial elevations, the cars have a tendency to jump the track which may result in very serious injury to the passengers, either due to the fall or due to the car coming in contact with the passenger in the course of the fall.

It is my object to provide a car which may be easily mounted and demounted on the track but which, when once mounted, cannot come off of the track except at either end thereof.

Referring to the drawings:

Figure 1 is a side elevation of the toboggan;

Figure 2 is a section through the track rails and track plates showing the track in position together with the car and car retaining means;

Figure 3 is a side elevation of the car;

Figure 4 is a plan view of one half of the car;

Figure 5 is a detail of the wheel housing;

Figure 6 is an outside elevation of the retaining hook;

Figure 7 is an inside side elevation of the retaining hook; and

Figure 8 is a front elevation of the retaining hook.

Referring to the drawings in detail, the toboggan is formed of parallel side rail track members 1, carried on supports 2 which are laterally braced by the braces 3. The toboggan starts from the platform 4 which is reached by a ladder 5 and terminates at the point 6 on a plane parallel to the surface of the water and adjacent thereto.

These side rails are formed of a plurality of superimposed members bolted together by the bolts 7. Upon them are the track plates 8 which are held in position by the bolts 7. These track plates overhang the side rail members 1 so that the retaining hook or safety device 9 may extend downwardly and outwardly beneath this plate 8. The retaining hook is mounted on the car bottom 20. These cross members 10 are located on the inside of the bottom 20 of the car. A ball bearing 13 is interposed between the axle and the wheel hub 14. This axle 12 is carried in a housing or guard 15 which is bolted at either end by the bolts 16 to the side rail members 17 which are mounted on either side of the car and are superimposed on the cross members 10. The retaining safety device hook 9 carried by the bottom 20 is located below the wheels, but may be located on either side thereof or on both sides. The wheel is provided with the usual flange 18 to keep the wheels on the track plate.

The housing 15 for the wheels is provided with laterally extending ears 19. These ears project beneath the cross members 10. The car is provided with a bottom 20 beneath the cross rails 10. The side rails are arched between the cross members 10, leaving a space 21 for the flow of water to prevent the car from holding water, and to provide hand holds.

It will be understood that I desire to comprehend within my invention such modifications as may be necessary to adapt it to varying conditions of use.

Having thus fully described my invention, what I claim as new and desire to secure by Letters Patent, is:—

1. The combination with an elevated and inclined trackway, a relatively long and flat vehicle adapted to support a person lying full length therein and to traverse the trackway, a plurality of enclosing casings projecting into and carried by the opposite sides of the vehicle and having their lower ends open, wheels journaled in the casings and projecting through the open ends thereof and adapted to engage the trackway.

2. The combination with an elevated and inclined trackway, of a relatively long and flat vehicle adapted to support a person lying full length therein and to traverse the trackway, a plurality of enclosing casings projecting into and carried by the opposite sides of the vehicle and having their lower ends open, wheels journaled in the casings and projecting through the open ends thereof and adapted to engage the trackway, and safety elements carried by the under face of the vehicle adjacent its opposite longitudinal edges and normally underlying the trackway.

3. A vehicle comprising a relatively flat body, longitudinal side members secured to the body at opposite sides thereof, substantially rectangular casings carried by the side members, a wheel arranged in each casing and normally projecting below the same, a stub shaft passing transversely through each casing and its wheel, a plurality of safety elements attached to the under face of the body adjacent its opposite longitudinal edges, each of such safety elements including oppositely extending flanges one of which being adapted to project beneath a trackway and the other constituting an attaching member.

4. The combination with an elevated trackway, of a relatively flat vehicle adapted to traverse the trackway, a plurality of casings carried by the opposite sides of the vehicle and having their ends open, wheels journaled in the casings and projecting through the open ends thereof and adapted to engage the trackway, and a plurality of safety elements attached to the underside of the vehicle adjacent its opposite longitudinal edges, each of such safety elements including oppositely extending flanges, one of which is adapted to project beneath said trackway and the other of which constitutes an attaching member.

5. A water toboggan comprising a relatively long flat body, longitudinal side members secured to the body at opposite sides thereof, said side members being arched at intervals, thereby providing hand holds and water drains, substantially rectangular casings carried by said side members, a wheel arranged in each casing and normally projecting below the same, said casings covering said wheels and thereby preventing accidental access to said wheels, said wheels being carried by a stub shaft passing through each casing and its wheel.

6. A water toboggan comprising a relatively long flat body, longitudinal side members secured to the body at opposite sides thereof, said side members being arched at intervals, thereby providing hand holds and water drains, substantially rectangular casings carried by said side members, a wheel arranged in each casing and normally projecting below the same, said casings covering said wheels, and thereby preventing accidental access to said wheels, said wheels being carried by a stub shaft passing through each casing and its wheel, and a plurality of safety elements attached to the underside of the toboggan adjacent its opposite longitudinal edges, each of such safety elements including oppositely extending flanges, one of which is adapted to project beneath a trackway and the other of which constitutes an attaching member.

In testimony whereof, I affix my signature.

AUREL VASZIN.